United States Patent
Ben Sahel et al.

(10) Patent No.: US 10,889,774 B2
(45) Date of Patent: Jan. 12, 2021

(54) LUBRICITY ADDITIVE FOR FUEL WITH A LOW SULPHUR CONTENT

(71) Applicant: TOTAL MARKETING SERVICES, Puteaux (FR)

(72) Inventors: Hakim Ben Sahel, Miribel (FR); Olivier Langlois, Taluyers (FR); Julien Herou, Fontenay Mauvoisin (FR); Laurent Germanaud, Heyrieux (FR)

(73) Assignee: TOTAL MARKETING SERVICES, Puteaux (FR)

( * ) Notice: Subject to any disclaimer, the term of this patent is extended or adjusted under 35 U.S.C. 154(b) by 39 days.

(21) Appl. No.: 15/756,608

(22) PCT Filed: Sep. 2, 2016

(86) PCT No.: PCT/FR2016/052168
§ 371 (c)(1),
(2) Date: Mar. 1, 2018

(87) PCT Pub. No.: WO2017/037392
PCT Pub. Date: Mar. 9, 2017

(65) Prior Publication Data
US 2018/0187110 A1    Jul. 5, 2018

(30) Foreign Application Priority Data

Sep. 3, 2015 (FR) .................................. 15 58161

(51) Int. Cl.
C10L 1/18 (2006.01)
C10L 1/188 (2006.01)
C10L 1/19 (2006.01)
C10L 10/08 (2006.01)
C11C 1/02 (2006.01)
C11C 1/08 (2006.01)

(52) U.S. Cl.
CPC ............... *C10L 1/1802* (2013.01); *C10L 1/18* (2013.01); *C10L 1/1881* (2013.01); *C10L 1/191* (2013.01); *C10L 10/08* (2013.01); *C11C 1/025* (2013.01); *C11C 1/08* (2013.01); *C10L 2270/026* (2013.01); *Y02E 50/10* (2013.01); *Y02E 50/30* (2013.01); *Y02T 50/678* (2013.01)

(58) Field of Classification Search
CPC combination set(s) only.
See application file for complete search history.

(56) References Cited

U.S. PATENT DOCUMENTS

| 6,129,772 A * | 10/2000 | Weers ...................... C10L 1/14 44/385 |
| 2007/0124991 A1* | 6/2007 | Reaney ................. C10L 1/1802 44/389 |
| 2007/0124992 A1* | 6/2007 | Reaney ................. C10L 1/1802 44/389 |
| 2008/0227993 A1* | 9/2008 | Zuckerman ............... C10L 1/19 554/149 |
| 2009/0186861 A1* | 7/2009 | Kempers ................. C11B 13/02 514/169 |
| 2011/0072714 A1* | 3/2011 | Gaertner ................. C10L 1/026 44/388 |

FOREIGN PATENT DOCUMENTS

| RU | 2 272 052 | 6/2004 |
| RU | 2 289 612 C1 | 12/2006 |
| WO | 98/04656 A1 | 2/1998 |
| WO | 2013/098524 A1 | 7/2013 |
| WO | WO-2013098524 A1 * | 7/2013 |
| WO | 2014/102492 A1 | 7/2014 |

OTHER PUBLICATIONS

Effects of Fatty Acids on Low-Sulfur Diesel Lubricity: Experimental Investigation, DFT Calculation and MD Simulation, Luo Hui et al., China Petroleum Processing and Petrochemical Technology, 2013, vol. 15, No. 2, pp. 74-81.
Re-esterified oils from palm acid oil do not alter pork fatty acid composition, Alba Tres et al., Eur. J. Lipid Sci. Technol. 2015, 1 17, 1406-1416.
Investigation of acid oil as a source of biodiesel, BM Kulkarni et al., Indian Journal of Chemical Technology, vol. 15, Sep. 2008, pp. 467-471.
XP-002755256, Blended fuel oil comprises mixing standard diesel oil and additives to prepare mother diesel oil, mixing with acidified oil or fatty acid or composition of acidified oil and methanol to obtain diesel oil.
Written Opinion, PCT/ISA/237 in corresponding PCT/FR2016/052168.
ISR, PCT/ISA/210 in corresponding PCT/FR2016/052168.
Communication dated Jan. 13, 2020 in Russian application No. 2018111743/10.

* cited by examiner

*Primary Examiner* — Ellen M McAvoy
*Assistant Examiner* — Chantel L Graham
(74) *Attorney, Agent, or Firm* — Sughrue Mion, PLLC

(57) ABSTRACT

The invention relates to a lubricity additive for fuel, particularly for diesel fuel, directly obtained from the acidification of a soapstock produced by a method for refining at least one vegetable and/or animal oil. The lubricity additive according to the invention is more specifically used for fuels that have a low sulfur content, for example, lower than 500 ppm (by weight).

9 Claims, No Drawings

LUBRICITY ADDITIVE FOR FUEL WITH A LOW SULPHUR CONTENT

CROSS REFERENCE TO RELATED APPLICATIONS

This application is a National Stage of International Application No. PCT/FR2016/052168 filed Sep. 2, 2016, claiming priority based on French Patent Application No. 15 58161 filed Sep. 3, 2015, the entire disclosures of which are incorporated herein by reference.

TECHNICAL FIELD

The present invention relates to a lubricity additive for internal combustion engine fuel, especially for diesel fuel, directly derived from the acidification of a soapstock obtained by a process of refining one or more vegetable and/or animal oils.

In order to limit discharges of polluting emissions, many regulations require relatively low contents of sulphur-containing compounds in fuels, especially diesel-type fuels. For this purpose, the hydrocarbons used for the production of fuels are subjected to hydrotreatment and hydrocracking processes in order to eliminate the sulphur-containing compounds that they naturally contain. This elimination of the sulphur-containing compounds leads to a loss of the lubricity of the fuels obtained.

However, diesel-type fuels and aviation fuels must have lubrication abilities for the protection of the pumps, the injection systems and all the moving parts with which these products come into contact in an internal combustion engine. Additives must then be added to these fuels in order to restore their lubricity.

The lubricity additive according to the invention is more particularly intended for internal combustion engine fuels having a low sulphur content, for example less than 500 ppm (by weight).

The acidification of a soapstock obtained by a process of refining a vegetable and/or animal oil makes it possible to obtain an oil referred to as acid oil. The invention also relates to the use of an acid oil or a mixture of acid oils derived from one or more soapstocks, as lubricity additive for fuel, especially low-sulphur fuel.

The invention finally relates to an internal combustion engine fuel composition containing the lubricity additive according to the invention, in particular a fuel composition for which the sulphur content is less than 500 ppm (by weight).

PRIOR ART

It is known to use fatty acids as lubricity additives. In general, the fatty acids used are produced by fractionation of vegetable or animal oils. For example, tall oil fatty acids or TOFAs are known for having good lubricity properties in low-sulphur diesel fuels (WO9804656). These fatty acids have a high acid value. The gain in the improvement in the lubricity is sizeable at a low proportion but tends to decrease as the proportion increases.

It is furthermore known to use monoglycerides and diglycerides as lubricity additives. Monoglycerides and diglycerides are esters produced from the reaction between fatty acids and glycerol. They have a very low acid value: reference is made to neutral lubricity. However, improvement in the lubricity is not immediate at a low proportion, requiring the use of large amounts, which increases the cost of the treatment.

There is therefore a need for novel lubricity additives for fuel, especially internal combustion engine fuel, that are inexpensive and effective, especially for diesel-type fuels.

BRIEF SUMMARY OF THE INVENTION

Soapstocks are by-products of the refining of crude (vegetable or animal) oils. They contain the saponifiable species present in the fatty substance after the extraction thereof. The acidification thereof makes it possible to obtain a mixture of fatty acids, esters and triglycerides referred to as "acid oil". The acid oils are thus mixtures of active materials having a low production cost.

The acid oils derived from the acidification of a soapstock obtained by a process of refining a vegetable and/or animal oil have good low-temperature properties compared to the fatty acids or esters of diglycerides or triglycerides generally used in diesel fuel lubricity.

A first subject of the invention thus relates to a lubricity additive for internal combustion engine fuel directly derived from a process of acidifying at least one soapstock obtained by a process of refining at least one oil selected from a vegetable and/or animal oil.

The lubricity additive according to the invention is thus derived solely from biomass.

Another subject of the invention relates to the use of one or more acid oils, directly derived from the acidification of at least one soapstock, as lubricity additive of internal combustion engine fuel, the soapstock being obtained by a process of refining at least one oil selected from a vegetable and/or animal oil.

Another subject of the invention relates to an internal combustion engine fuel composition, especially a diesel fuel, having a sulphur content of less than 500 ppm and comprising a lubricity additive according to the invention.

Advantageously, the lubricity additive content of the fuel composition is sufficient for the fuel composition to have a lubricity less than or equal to 500 µm, preferably less than or equal to 460 µm, preferentially less than or equal to 400 µm under the conditions of the HFRR (High Frequency Reciprocating Rig) test as described in the SAE 932692 article by J. W. HADLEY of the University of Liverpool.

Advantageously, the lubricity additive content of the fuel composition is less than or equal to 1000 ppm (by weight), preferably less than or equal to 500 ppm by weight, preferentially between 10 and 400 ppm by weight (limits included).

The invention also relates to a process for producing an internal combustion engine fuel composition, comprising a step during which at least one lubricity additive, directly derived from a process of acidifying at least one soapstock obtained by a process of refining at least one oil selected from a vegetable and/or animal oil, is added to at least one fuel. The lubricity additive content of the fuel composition may be as specified above.

The invention also relates to a process for improving the lubricity of an internal combustion engine fuel composition, comprising a step during which at least one lubricity additive, directly derived from a process of acidifying at least one soapstock obtained by a process of refining at least one oil selected from a vegetable and/or animal oil, is added to a fuel composition. The lubricity additive content of the fuel composition may be as specified above.

DETAILED DESCRIPTION OF THE INVENTION

The lubricity additive according to the invention is directly derived from a process of acidifying at least one soapstock. This soapstock is obtained, especially directly, by a process of refining at least one oil selected from a vegetable and/or animal oil.

The lubricity additive according to the invention is thus an acid oil or a mixture of acid oils.

An acid oil may be defined as being compositions of fatty acids neutralized by a base then acidified.

The fatty acids advantageously originate directly from the saponification of a vegetable and/or animal oil, such as, without being limiting, a sunflower, soya, rapeseed, linseed, palm, coconut, peanut or olive oil, or a fish oil, conventionally comprising, in a very great majority, saturated or unsaturated $C_{16}$-$C_{18}$ carbon-based chains, among which are preferably $C_{18}$ unsaturated carbon-based chains. Vegetable oils customarily comprise palmitic acid, oleic acid, linoleic acid and other acids in smaller quantities. The compositions of fatty acids neutralized by a base are typically soapstocks.

According to one preferred embodiment, the lubricity additive according to the invention is solely derived from one or more vegetable oils. In other words, it is directly derived from a process of acidifying at least one soapstock obtained by a process of refining at least one vegetable oil.

The lubricity additive according to the invention may also advantageously have one or more of the following features:
(a) a content of free fatty acids of greater than or equal to 5% by weight, advantageously greater than or equal to 10% by weight, preferably from 10% to 90% by weight, more preferentially from 30% to 70% by weight,
(b) a content of triglycerides of greater than or equal to 5% by weight, advantageously greater than or equal to 15% by weight, preferably from 10% to 60% by weight,
(c) a content of fatty acids containing more than two unsaturations of less than or equal to 40% by weight, preferably less than or equal to 20% by weight, preferentially less than or equal to 10% by weight, for example from 0.05% to 10% by weight,
(d) a content of $C_{18}$:1 and $C_{18}$:2 fatty acids of greater than or equal to 40% by weight, preferably greater than or equal to 60% by weight, preferentially greater than or equal to 70% by weight, for example from 70% to 95% by weight,
(e) a pour point of less than or equal to −3° C., preferably less than or equal to −9° C.

Advantageously, the lubricity additive according to the invention may have features a) and b).

Advantageously, the lubricity additive according to the invention may have features a), b) and e).

Advantageously, the lubricity additive according to the invention may have all of the features a) to e).

The acidification process that makes it possible to directly obtain the lubricity additive according to the invention may comprise:
a) a step of extracting the fatty acids present in at least one soapstock derived from the refining of one or more oils selected from a vegetable oil and/or an animal oil, this extraction step being carried out in an acid medium under conditions effective for forming an aqueous phase and an organic phase comprising said fatty acids,
b) a separation step during which said previously formed organic phase is separated and recovered.

The organic phase recovered in step b) constitutes an acid oil. Such an acid oil generally has a water content of less than or equal to 3 wt %.

Soapstock Used During Step a)

The soapstock treated in step a) may be a mixture of soapstocks derived from the refining of various oils or may be a soapstock derived from the refining of a single oil.

Such soapstocks originate, in particular directly, from the saponification of a vegetable oil and/or of an animal oil.

The soapstock treated in step a) may thus be obtained, in particular directly, by a process of refining a vegetable and/or animal oil comprising:
a1) a step of saponifying a vegetable or animal oil or a mixture of vegetable and/or animal oils under conditions effective for saponifying the free fatty acids present in the oil or the mixture of oils and for forming a soapstock,
a2) a step of separating the oil or the mixture of oils and the soapstock formed during step a1).

In general, the saponification step a1) is carried out by addition of a base, generally sodium hydroxide, and makes it possible to eliminate the free fatty acids present in the oil, which are found in the soapstock in the form of alkali metal salts of fatty acids. Before this saponification step a1), the vegetable and/or animal oil may undergo a degumming or mucilage removal operation that aims to eliminate the phospholipids, lecithins, sugar complexes and other impurities.

Step a2) of separating the oil and the soapstock resulting from the saponification may be carried out by centrifugation.

The soapstocks thus essentially comprise fatty acids neutralized by a base.

In addition to the fatty acids neutralized by a base, the soapstocks may contain, depending on their origin and the quality of the saponification, phospholipids or monoglycerides, diglycerides or triglycerides that have not reacted. Customarily, the fatty acids have $C_{12}$-$C_{24}$, preferably $C_{16}$-$C_{20}$, or better still $C_{16}$-$C_{18}$ carbon-based chains.

A soapstock is therefore a product derived from biomass. Advantages associated with such soapstocks lie, on the one hand, in their low processing cost and, on other hand, in the absence of undesirable toxic substances, such as pesticides, aflatoxins, heavy metals, dioxin and furan precursors, PCBs and nitrites.

Extraction Step a)

The role of the extraction step a) of the acidification process is to extract the fatty acids contained in the soapstock. This extraction is carried out in an acid medium under conditions effective for forming an aqueous phase and an organic phase comprising the fatty acids initially contained in the soapstock.

This organic phase comprising the fatty acids is generally referred to as "acid oil", or else "neutralization oil".

The acid used for extracting the fatty acids present in the soapstock in the form of salts is generally an inorganic acid, such as for example sulphuric acid, phosphoric acid or hydrochloric acid.

Sulphuric acid is however preferred since it enables a better extraction of the fatty acids at a favourable economic cost.

The extraction is generally carried out with heating, to a temperature between 70° C. and 100° C. (limits included), preferably between 80° C. and 90° C. (limits included).

In order to obtain a good extraction of the fatty acids, an acid pH is preferably maintained over the reaction time, for example a pH of less than or equal to 6, preferably less than or equal to 4.

The reaction time is selected to enable an extraction of all of the fatty acids. It is for example from 1 hour to 12 hours, depending on the geometry of the reactor, and the nature and composition of the feedstock to be treated.

The extraction is preferably carried out with stirring.

Thus the formation of an aqueous phase and an organic phase containing the fatty acids is obtained.

Separation Step b)

During this step, the organic phase formed during step a) is separated from the aqueous phase. In other words, the acid oil forming the lubricity additive according to the invention is isolated.

This separation step b) may be carried out by distillation, settling, or even centrifugation. This step may be implemented by any suitable, known and commercially available devices.

Advantageously, this separation is carried out by settling, followed by an elimination of the aqueous phase. The settling depends on the difference in density of the liquids and in the viscosity thereof, parameters which may be modified in a known manner by a person skilled in the art in order to favour the separation if necessary.

The acid oil obtained may be used as a lubricity additive of internal combustion engine fuel that may have one or more of the features a) to e) mentioned above.

Advantageously, before its use as lubricity additive, the acid oil may undergo one or more treatment steps selected from a centrifugation, a filtration and a precipitation. In particular, a centrifugation step may make it possible to obtain a water content of less than or equal to 1% by weight, or even less than or equal to 0.8% by weight, in particular from 0.1% to 0.7% by weight.

Besides the elimination of water, recovered in an aqueous phase, the centrifugation may also enable the elimination of a portion of the suspended solid residues.

The lubricity additive described above may advantageously be added to an internal combustion engine fuel composition in order to improve the lubricity thereof.

The fuel composition may comprise at least one liquid hydrocarbon-based fuel selected from gas oils, diesel fuels, petrols, biofuels, jet fuels, domestic fuel oils (DFOs) and heavy fuel oils, preferably gas oils and diesel fuels.

According to one particular embodiment, the fuel composition may comprise at least one fuel or combustible selected from middle distillates having a boiling point between 100° C. and 500° C., preferably 140° C. to 400° C.

These middle distillates may, for example, be selected from the distillates obtained by direct distillation of crude hydrocarbons, vacuum distillates, hydrotreated distillates, distillates derived from the catalytic cracking and/or hydrocracking of vacuum distillates, distillates resulting from conversion processes of ARDS (atmospheric residue desulphurization) type and/or visbreaking type, distillates derived from the upgrading of Fischer-Tropsch fractions, distillates resulting from the BTL (biomass to liquid) conversion of vegetable and/or animal biomass, and/or mixtures thereof.

The fuels may also contain distillates derived from refining operations that are more complex than those derived from the direct distillation of the hydrocarbons. The distillates may, for example, originate from cracking, hydrocracking and/or catalytic cracking processes and from visbreaking processes.

The fuels may also contain novel sources of distillates, among which mention may especially be made of:
- the heaviest fractions derived from cracking and visbreaking processes concentrated to give heavy paraffins, comprising more than 18 carbon atoms,
- the synthetic distillates derived from the transformation of the gas such as those derived from the Fischer-Tropsch process,
- the synthetic distillates resulting from the treatment of the biomass of vegetable and/or animal origin, such as in particular NexBTL,
- and the vegetable and/or animal oils and/or esters thereof, preferably fatty acid methyl esters (FAMEs) or fatty acid ethyl esters (FAEEs), in particular vegetable oil methyl esters (VOMEs) or vegetable oil ethyl esters (VOEEs),
- the hydrotreated and/or hydrocracked and/or hydrodeoxygenated (HDO) vegetable and/or animal oils,
- or else the biodiesels of animal and/or vegetable origin.

The fuel composition may comprise only novel sources of distillates or be composed of a mixture with conventional petroleum middle distillates such as a diesel-type fuel base and/or a domestic fuel oil base. These novel sources of distillates in general comprise long paraffinic chains greater than or equal to 10 carbon atoms, and preferentially $C_{14}$ to $C_{30}$ chains.

In general, the sulphur content of the fuel composition according to the invention is less than 500 ppm, preferably less than 50 ppm, or even less than 10 ppm and advantageously has no sulphur, especially for diesel-type fuels.

The fuel composition according to the invention may be obtained by a production process comprising a step during which at least one lubricity additive, directly derived from a process of acidifying at least one soapstock obtained by a process of refining at least one oil selected from a vegetable and/or animal oil, is added to at least one fuel.

The lubricity additive according to the invention may be used in the fuel composition in combination with one or more additional additives. These additional additives may be selected from dispersants/detergents, carrier oils, metal deactivators, metal passivators, antioxidants, dyes, antistatic additives, corrosion inhibitors, biocides, markers, heat stabilizers, emulsifiers, antistatic agents, friction reducers, surfactants, cetane number improvers, anti-clouding agents, additives that improve the conductivity, reodorants and mixtures thereof.

Among the other additional additives, mention may particularly be made of:

a) cetane booster additives, such as for example alkyl nitrates;

b) antifoam additives, examples of such additives are given in EP 0 861 182, EP 0 663 000, EP 0 736 590;

c) detergent and/or anticorrosion additives, examples of such additives are given in EP 0 938 535, US 2012/0010112 and WO 2012/004300;

e) cloud point additives. Examples of such additives are given in EP 0 071 513, EP 0 100 248, FR 2528051, FR 2528051, FR 2528423, EP 112 195, EP 0 172 758, EP 0 271 385, EP 0 291 367;

f) anti-settling additives and/or paraffin dispersants. Examples of such additives are given in EP 0 261 959, EP 0 593 331, EP 0 674 689, EP 0 327 423, EP 0 512 889, EP 0 832 172, US 2005/0223631, U.S. Pat. No. 5,998,530, WO1993/014178;

g) polyfunctional additives for cold operability selected in particular from the group consisting of olefin- and alkenyl nitrate-based polymers as described in EP 0 573 490;

h) additives that improve the cold behaviour and filterability (CFI), such as ethylene/vinyl acetate (EVA) and/or ethylene/vinyl propionate (EVP) copolymers;

i) other antioxidants of hindered phenolic type or amino type of alkyl paraphenylenediamine type;

j) metal passivators, such as triazoles, alkyl benzotriazoles and alkyl tolutriazoles;

k) metal scavengers such as disalicylidene propanediamine (DMD);

l) acidity neutralizers such as cyclic alkylamines.

A fuel composition may thus be obtained by a process comprising:

(1) a step of providing one or more fuels,
(2) a step of adding at least one lubricity additive according to the invention to the fuel(s) provided in step (1).

The process may optionally comprise a step of adding at least one additional additive of the type described above.

In order to explain the advantages of the present invention, illustrative but non limiting examples are given below of the scope of the claimed invention.

The following notations were used:
AO: acid oil,
FA: free fatty acids,
MG: monoglycerides,
DG: diglycerides,
TG: triglycerides,
VOME: vegetable oil methyl esters,
Cx:y, fatty acid having x carbon atoms and y unsaturations (carbon-carbon double bonds).

EXAMPLES

The lubricity of several additives in two diesel-type fuels for a diesel engine were tested under the conditions of the HFRR (High Frequency Reciprocating Rig) test as described in the SAE 932692 article by J. W. HADLEY of the University of Liverpool. This lubricity may thus be defined as the property of a liquid determined by measuring the wear scar produced by the contact of an oscillating ball on a fixed plate immersed in the liquid and under tightly controlled conditions.

The test consists in jointly imposing on a steel ball in contact with an immobile metal plate, a pressure corresponding to the weight of 200 g and an alternating displacement of 1 mm at a frequency of 50 Hz. The moving ball is lubricated by the composition to be tested. The temperature is maintained at 60° C. over the duration of the test, that is to say for 75 min. The lubricity is expressed by the average value of the diameters of the wear scar of the ball on the plate. The smaller the wear diameter, the better the lubricity. Generally a wear diameter of less than or equal to 460 µm±63 µm is required for a diesel-type fuel.

The characteristics of the diesel fuels tested are collated in Table 1.

Various additives were added to these diesel fuels in amounts ranging from 100 to 300 ppm (by weight) depending on the tests. An HFRR test was carried out for each additive in order to determine the lubricity.

Table 2 collates the characteristics of the acid oils tested as lubricity additive.

All the acid oils tested are directly derived from a process for acidifying at least one soapstock obtained by a process of refining one or more vegetable and/or animal oils.

Obtention of the Acid Oils Tested

A soapstock underwent the following treatment:
injection of 120 l of 97% sulphuric acid into a reactor containing 4000 kg of soapstock, where the temperature is from 80° C. to 90° C. The reaction time is 24 hours, under continuous control of the pH in order to maintain the pH at a value below 4, settling of the aqueous phase and of the organic phase formed during step a1) then elimination of the aqueous phase.

TABLE 1 characteristics of the diesel fuels

| | Diesel no. 1 | Diesel no. 2 | Standard | Units |
|---|---|---|---|---|
| Cold filter plugging point | −19 | −6 | NF EN 116 | ° C. |
| Pour point | −18 | −9 | ASTM D97 | ° C. |
| Cloud point | −8 | −6 | ASTM D7689 | ° C. |
| Density at 15° C. | 825.1 | 838.6 | NF EN ISO12185 | kg/m$^3$ |
| Sulphur content | <10 | <10 | EN ISO20846 EN ISO20884 | mg/kg |
| VOME content | 0.03 | ≈0 | EN14078 | % vol |
| Distillation | | | ASTM D86 | ° C. |
| 0% | 165 | 176 | | |
| 5% | 195 | 193 | | |
| 10% | 209 | 201 | | |
| 20% | 229 | 218 | | |
| 30% | 245 | 235 | | |
| 40% | 259 | 252 | | |
| 50% | 273 | 268 | | |
| 60% | 287 | 284 | | |
| 70% | 302 | 300 | | |
| 80% | 320 | 318 | | |
| 90% | 343 | 340 | | |
| 95% | 362 | 356 | | |
| 100% | 371 | 365 | | |

TABLE 2 characteristics of the acid oils tested as lubricity additive

| | Rapeseed AO 1 | Rapeseed AO2 | Mixed vegetable (rapeseed, sunflower . . . ) AO | Linseed AO | Fish AO |
|---|---|---|---|---|---|
| FA (wt %) | 39.1 | 54.7 | 67.9 | 38.1 | 47.9 |
| MG (wt %) | 0.9 | 2.6 | 1.4 | 1.6 | 1.4 |
| DG (wt %) | 4.4 | 8.5 | 9.2 | 12.9 | 8 |
| TG (wt %) | 55.3 | 31.5 | 19.2 | 46.7 | 41.5 |
| Pour point (° C.) | −15 | −12 | −21 | 0 | 15 |
| Content of C18:1 + C18:2 FA (weight %) | 90.9 | 80.2 | 77.1 | 37.5 | 20.8 |
| Content of FA having a number of unsaturations >2 (weight %) | 0.1 | 7.7 | 0.1 | 51.1 | 35.3 |

Table 3 collates the characteristics of two commonly used lubricity additives. Comparative additive 1 is a mixture of fatty acid esters essentially containing monoglycerides and diglycerides. Comparative additive 2 is a mixture essentially containing free fatty acids.

TABLE 3 characteristics of the comparative additives tested

| Additive | Comparative 1 | Comparative 2 (TOFA) |
|---|---|---|
| FA (wt %) | 0 | 96.9 |
| MG (wt %) | 45.1 | 0 |

TABLE 3-continued characteristics of the comparative additives tested

| Additive | Comparative 1 | Comparative 2 (TOFA) |
|---|---|---|
| DG (wt %) | 42.5 | 0 |
| TG (wt %) | 10 | 0 |
| Pour point (° C.) | −21 | −15 |
| Content of C18:1 + C18:2 FA (weight %) | 78.2 | 86.1 |
| Content of FA having a number of unsaturations >2 (weight %) | 8.2 | 0.3 |

Example 1

In this example, various additives were added to diesel no. 1.

The results are collated in Table 4.

The values indicated correspond to the average of the results obtained, which are within an interval of ±10 µm.

It is observed that the acid oil derived from linseed oil is the least effective of the acid oils in terms of lubricity (HFRR test). For a content of 300 ppm, the result of the HFRR test is greater than the specification of 460 µm for the diesel fuels while this specification is met for the other acid oils tested. Unlike the other acid oils, this acid oil derived from linseed oil has a content of fatty acids having more than 2 unsaturations of greater than 40% by weight.

TABLE 4 lubricity of diesel no. 1 in the presence of various additives

| Additive | Proportion (mg/kg) | HFRR (µm) |
|---|---|---|
| Rapeseed AO 1 | 0 | 580 |
|  | 200 | 431 |
|  | 300 | 428 |
| Linseed AO | 0 | 580 |
|  | 200 | 524 |
|  | 300 | 489 |
| Fish AO | 0 | 580 |
|  | 200 | 416 |
|  | 300 | 408 |
| Mixed vegetable (rapeseed, sunflower . . . ) AO | 0 | 580 |
|  | 200 | 472 |
|  | 300 | 422 |
| Comparative 1 | 0 | 580 |
|  | 200 | 504 |
|  | 300 | 409 |
| Comparative 2 | 0 | 580 |
|  | 200 | 457 |
|  | 300 | 428 |

Example 2

In this example, various additives were added to diesel no. 2.

The results are collated in Table 5.

The values indicated correspond to the average of the results obtained, which are within an interval of ±10 µm.

It is observed that the acid oil derived from fish oil is less effective in terms of lubricity (HFRR test) than the acid oils derived from vegetable oils.

It will also be noted that the acid oil derived from fish oil and the acid oil derived from linseed oil have pour points above −10° C. For these two acid oils, the contents of $C_{18}$:1+$C_{18}$:2 fatty acids are less than 40% by weight. In addition, the content of fatty acids having a number of unsaturations of more than 2 is greater than 10%.

The other acid oils meet the specification of 460 µm for a content of only 200 ppm.

It is also noted that the rapeseed AO 1 oil has the best results, in particular greater than the TOFA oil (comparative no. 2).

TABLE 5 lubricity of diesel no. 2 in the presence of various additives

| Additive | Proportion (mg/kg) | HFRR (µm) |
|---|---|---|
| Rapeseed AO 1 | 0 | 608 |
|  | 200 | 424 |
| Rapeseed AO 2 | 0 | 608 |
|  | 200 | 445 |
| Fish AO | 0 | 608 |
|  | 200 | 494 |
| Mixed vegetable (rapeseed, sunflower . . . ) AO | 0 | 608 |
|  | 200 | 461 |
| Comparative no. 2 (TOFA) | 0 | 608 |
|  | 200 | 438 |

The invention claimed is:

1. A method of using one or more acid oils, directly derived from acidification of at least one soapstock, the method comprising adding the one or more acid oils to an internal combustion engine fuel as a lubricity additive in a content of less than or equal to 1000 ppm by weight, thus obtaining an internal combustion engine fuel composition,
wherein the soapstock is obtained by a process of refining at least one oil selected from a vegetable and/or animal oil,
the lubricity additive has a content of triglycerides of greater than or equal to 5% by weight.

2. The method according to claim 1, wherein the lubricity additive has a content of free fatty acids of greater than or equal to 5% by weight.

3. The method according to claim 1, wherein the lubricity additive has a content of fatty acids containing more than two unsaturations of less than or equal to 40% by weight.

4. The method according to claim 1, wherein the lubricity additive has a content of $C_{18}$: 1 and $C_{18}$:2 fatty acids of greater than or equal to 40% by weight.

5. The method according to claim 1, wherein the lubricity additive has a pour point of less than or equal to −3° C.

6. The method according to claim 1, wherein the lubricity additive is directly derived from a process of acidifying at least one soapstock obtained by a process of refining at least one vegetable oil.

7. The method according to claim 1, wherein the lubricity additive is directly obtained by an acidification process comprising:
a) a step of extracting fatty acids present in at least one soapstock derived from the refining of one or more oils selected from a vegetable oil and/or an animal oil, this extraction step being carried out in an acid medium under conditions effective for forming an aqueous phase and an organic phase comprising said fatty acids,
b) a separation step during which said previously formed organic phase is separated and recovered.

8. The method according to claim 7, wherein the soapstock treated in step a) is obtained by a process of refining a vegetable and/or animal oil comprising:

a1) a step of saponifying a vegetable or animal oil or a mixture of vegetable and/or animal oils under conditions effective for saponifying the free fatty acids present in the oil or the mixture of oils and for forming a soapstock, a2) a step of separating the oil or the mixture of oils and the soapstock formed during step a1).

9. The method according to claim 1, wherein the internal combustion engine fuel composition has a sulphur content of less than 500 ppm.

* * * * *